United States Patent
Garg et al.

(10) Patent No.: US 8,943,247 B1
(45) Date of Patent: Jan. 27, 2015

(54) MEDIA SINK DEVICE INPUT IDENTIFICATION

(71) Applicant: Amazon Technologies, Inc., Reno, NV (US)

(72) Inventors: Parag Kumar Garg, Woodinville, WA (US); Kevin Thomas Weston, Jr., Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 76 days.

(21) Appl. No.: 13/711,705

(22) Filed: Dec. 12, 2012

(51) Int. Cl.
*G06F 13/00* (2006.01)
*G06F 3/00* (2006.01)
*H04N 5/44* (2011.01)

(52) U.S. Cl.
CPC .................. *H04N 5/4403* (2013.01)
USPC ............................................ 710/104; 725/38

(58) Field of Classification Search
None
See application file for complete search history.

(56) References Cited

U.S. PATENT DOCUMENTS

2009/0251604 A1* 10/2009 Iyer ............................... 348/554
2012/0236156 A1* 9/2012 Johnson ....................... 348/181

* cited by examiner

*Primary Examiner* — Idriss N Alrobaye
*Assistant Examiner* — Richard B Franklin
(74) *Attorney, Agent, or Firm* — Lindauer Law, PLLC

(57) ABSTRACT

Described herein are systems and methods for identifying which input of a sink device a source device is coupled to. The source devices provide content and are coupled to the sink devices which present at least a portion of the content. The source device provides a predetermined reference signal to the sink device. Selection of a plurality of inputs on the sink device is initiated until an emitted signal from the sink device which is based on the reference signal is detected by a sensor coupled to the source device. Once detected, the selected input may be associated with the source device. The source device may then use the associated input for automatic configuration of the sink device during future presentation of content.

22 Claims, 10 Drawing Sheets

MEDIA SINK DEVICE INPUT IDENTIFICATION

BACKGROUND

A wide variety of media devices are available for consumers to use for the consumption of content. Some of the media devices may be "source devices" which provide content to another device. Source devices include set-top boxes, Blu-ray® players, cable interface boxes, game consoles, satellite broadcast receivers, radio receivers, and so forth. Some of the media devices may be "sink devices" which present content or a portion of the content received from a source device. Media devices such as televisions and audio/video receivers ("AVR") are sink devices which output images and sounds, respectively.

Each sink device may have more than one input. For example, a television may have five inputs while an AVR may have three. These inputs may be provided to facilitate connection with several of the different source devices. For example, the five inputs of the television may be connected to different source devices such as a set-top box, Blu-ray® player, cable interface box, game console, and a satellite broadcast receiver. The sink device is configured to present data received at one of the inputs from the source device. For example, to present content provided by the set-top box, the television is set to the input corresponding to the set-top box. Continuing the example, to present content from the game console, a different input of the sink device is selected. Incorrect selection of the input on the sink device may result in an adverse user experience, such as preventing the user from consuming content. Traditionally, this has required additional configuration by the user.

Figure 1:
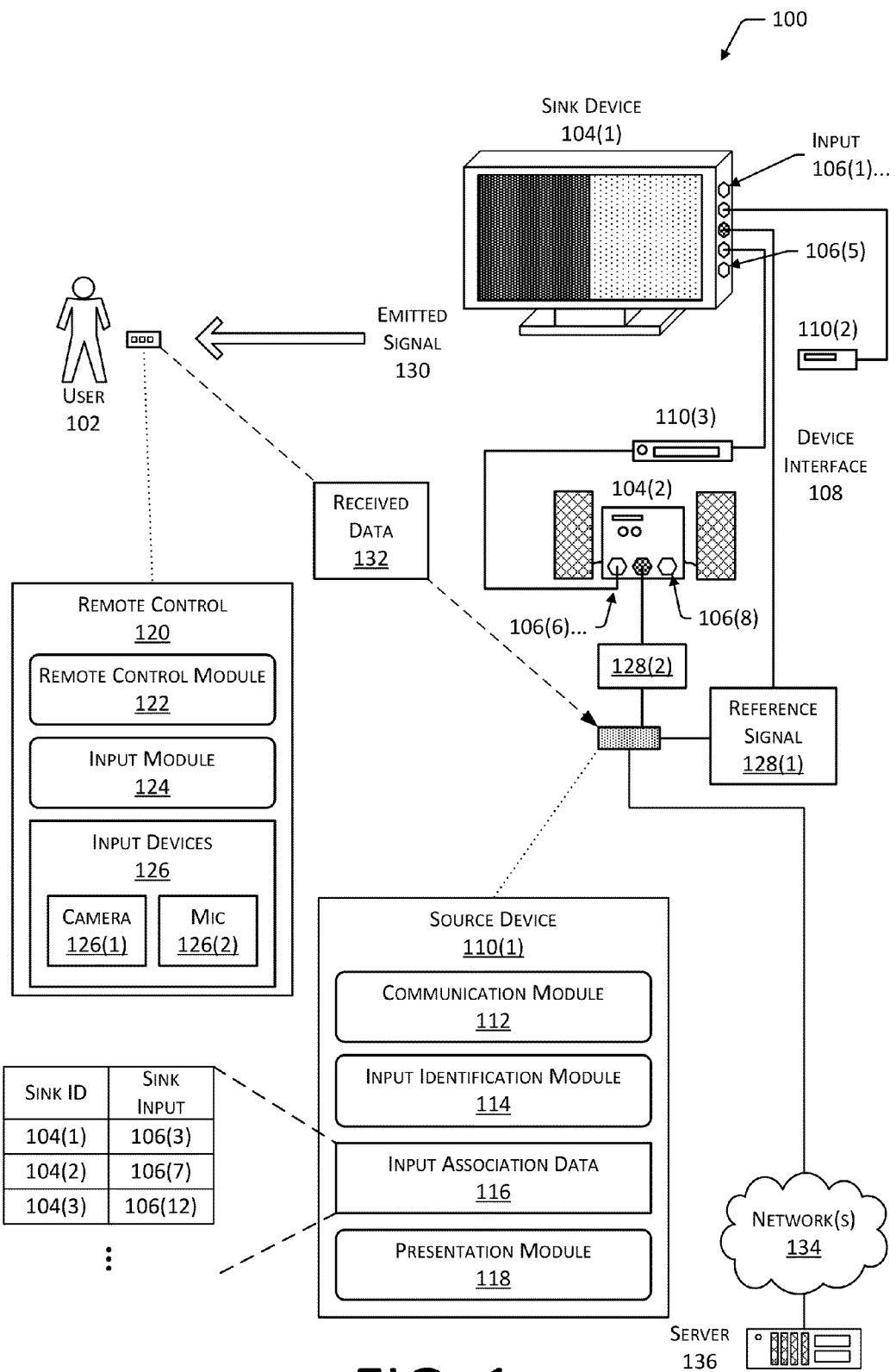
FIG. 1 is an illustrative system for input switching identification between a source device and a sink device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media source devices ("source devices") provide content to media sink devices ("sink devices") for presentation. Source devices may include set-top boxes, Blu-ray® players, cable interface boxes, game consoles, satellite broadcast receivers, radio receivers, and so forth. Sink devices may include televisions and audio/video receivers ("AVR") which output images and sounds, respectively.

Each sink device may have more than one input. For example, a television may have five inputs. These inputs may be provided to facilitate connection with several of the different source devices. For example, the five inputs of the television may be connected to different source devices such as a set-top box, Blu-ray® player, cable interface box, game console, and a satellite broadcast receiver. The sink device is configured to present data received at the inputs from one or more of the source devices. Typically the sink device presents a single input, although in some implementations the sink device may be configured to present multiple inputs simultaneously. For example, where the sink device is a television, it may be configured to present a first input as the primary image from source device and a second input from a second source device as an inset image, such as a picture-in-picture. For ease of illustration and not as a limitation, this disclosure assumes presentation of data or content from a single input.

The source device and the sink device are communicatively coupled to one another with a device interface. For example, the device interface may comprise the high definition multimedia interface ("HDMI"). As mentioned previously, some sink devices may have more than one device interface input. The inputs may be unconnected, or connected to one or more different source devices. When a particular source device tries to provide content using the device interface, the sink device needs to be configured to present the content received on the input which corresponds to that sink device. For example, when the set-top box is attempting to present video while plugged into input 1 of the television, the television needs to be set to input 1. Similarly, when the Blu-ray® player is attempting to present video while plugged into input 2 of the television, the television needs to be set to input 2.

Some sink devices may be unable to provide data to the source device as to which of the inputs on the sink device is currently being used for presentation. As a result, the source device is unaware of whether content which is being sent to the sink device is actually being presented. This may result in an adverse user experience, such as the user being unable to see or hear the output from the source device. Traditionally, this has required manual user intervention, such as a user manually selecting various inputs with a remote control.

Described in this disclosure are methods and systems for automatically identifying media sink device inputs and building input association data which relates a particular input of the sink device as being connected to the source device. The input association data may then be used to automatically select the appropriate input for a particular sink device during presentation of content.

The source device is configured to send a reference signal using the device interface to the sink device. The source device initiates selection of one of the plurality of inputs on the sink device. Once an input is selected, the source device uses one or more input devices to detect an emitted signal, which is based at least in part on the reference signal. For example, the reference signal may comprise a particular audio waveform which may be presented as the emitted signal by the speakers of the sink device. In this example, the input device may comprise a microphone coupled to the source device.

When the emitted signal is not detected, the source device may initiate selection of other inputs on the sink device, until the emitted signal is detected. When the emitted signal is detected, the source device may relate the selected input with the sink device to build the input association data. Once the input association data is available, the source device may select the appropriate input on the sink device to present content without further testing.

Using these techniques, the overall user experience while consuming content may be improved. The user may easily initiate presentation of content, and the presentation of that content may be assured.

Illustrative System

FIG. 1 is an illustrative system 100 for input switching identification. A user 102 is depicted with a sink device 104 to consume content. While a single user 102 is shown, more than one user 102 may consume content at a given time, such as where multiple users 102 are watching the presented content together.

The sink device 104 (or "sink device") may include media output devices such as televisions, projectors, or other displays, audio/video receivers ("AVR"), rendering devices, audio output devices, haptic output devices, and so forth. Illustrated here is a sink device 104(1) comprising a television and a sink device 104(2) comprising an AVR. Each sink device 104 includes one or more inputs 106(1), 106(2), ..., 106(N). For example, in this illustration, the sink device 104(1) includes inputs 106(1)-(5) while the sink device 104(2) includes inputs 106(6)-(8). The inputs 106 may be physical inputs such as discrete physical connectors, or the inputs 106 may be virtual such as different streams of data transferred on a common data bus or channel. The input references in this disclosure are unique for illustrative purposes only. For example, the inputs 106 may simply be designated as input 1, 2, 3, and so forth. The combination of a particular sink device 104 and the input 106 may be considered unique in some implementations.

Each input 106 is associated with one or more device interfaces 108. The device interface 108 may be a High Definition Multimedia Interface ("HDMI") as promulgated by HDMI Licensing LLC, TOSLINK® as promulgated by Toshiba Corp., Ethernet, analog video, analog audio, IEEE 1394 as promulgated by the Institute for Electrical and Electronics Engineers, Universal Serial Bus as promulgated by the USB Implementers Forum, Bluetooth® as promulgated by the Bluetooth Special Interest Group, ZigBee® as promulgated by the ZigBee Alliance, and so forth. In some implementations, the sink device 104 may support different types of inputs 106. For example, the inputs 106(1)-(3) of the sink device 104 may support HDMI, while the input 106(4) supports USB 3.0, and the input 106(5) supports analog audio and video. The sink device 104 includes one or more mechanisms for switching between the different inputs 106.

The inputs 106 of the sink device 104 are connected by the device interface 108 to one or more source devices 110. For example, the television may be connected to the set-top box and the Blu-ray® player. The source device 110 may include a communication module 112, an input identification module 114, an input association data 116, and a presentation module 118.

The communication module 112 is configured to establish and support communications between the source device 110 and one or more sink devices 104, other source devices 110, and other devices. For example, the communication module 112 may execute instructions which support transmission of data according to the HDMI specification.

The input identification module 114 is configured to determine a particular input 106 on the sink device 104 which results in the presentation of content. Based on the determination, the input identification module 114 generates the input association data 116. The input identification module 114 may determine the input 106 coupled to the source device 110 by initiating changes to the inputs 106 currently selected on the sink device 104 while applying a signal along the device interface 108 and monitoring for this signal. Operation of the input identification module 114 is discussed below in more detail.

The input association data 116 is information about one or more relationships between a particular sink device 104 and a particular input 106 of that sink device 104. In one implementation, the input association data 116 may comprise a data structure such as a table illustrated here with a sink device identifier ("sink device ID") and a sink device input. In this illustration, the input association data 116 indicates that the source device 110(1) is able to present content on the sink device 104(1) when the sink device 104(1) is set to use input 106(3). Likewise, the sink device 104(2) is able to present content from the source device 110(1) when set to input 106(2).

The communication module 112 may be configured to access the input association data 116 to setup for presentation of content or other information such as user interface data to the sink device 104. For example, the communication module 112 may receive a request for presentation of content on the sink device 104(2). Based at least in part on this request, the input association data 116 may be accessed to determine that the sink device 104(2) needs to be configured to use input 106(7) for presentation to occur. The communication module 112 may initiate selection of the input 106(7) on the sink device 104(2) using a variety of methods. For example, the communication module 112 may send commands along the device interface 108 to the sink device 104(2) to change to the sink device 104(2) to the input 106(7). The source device 110 is discussed in more detail below with regard to FIG. 7.

The system 100 may include a remote control 120. The remote control 120 may include a remote control module 122, an input module 124, and one or more input devices 126. The remote control module 122 is configured to generate control signals which are configured to initiate one or more operations on one or more of the sink device 104, the source device 110, and so forth. The remote control module 122 is configured to communicate with the source device 110 such that data may be exchanged between the two devices. The input module 124 is configured to acquire data from the one or more input devices 126 and provide at least a portion of that data to the source device 110. The input devices 126 may include one or more of a camera 126(1), a microphone ("mic") 126(2), and so forth.

Returning to the input identification module 114, a reference signal 128 may be delivered to the sink device 104 at the input 106 using the device interface 108. The reference signal 128 may comprise audio, video, still images, or other information which is configured for rendering by the sink device 104. The sink device 104 renders the reference signal 128 and generates an emitted signal 130. The emitted signal 130 may be a sound produced by a speaker, a picture presented by a display device, and so forth. The emitted signal 130 is discussed in more detail below with regard to FIG. 2.

The one or more input devices 126 in the remote control 120 or another device may be configured to detect at least a portion of the emitted signal 130. The input devices 126 may provide a received data 132, which may include the emitted signal 130, to the source device 110. When the source device 110 receives the received data 132, the input identification module 114 may associate the current input 106 of the sink device 104 with the sink device 104 to build the input association data 116.

The source device 110 may couple to one or more networks 134. In some implementations, other devices such as the sink device 104 may also couple to the one or more networks 134. The one or more networks 134 may include one or more public networks such as the Internet, private networks, or a combination of both, which are configured to transfer data between devices. The network 134 in turn couples to a server 136. While a single server 136 is depicted, in some implementations, the server 136 or the functions attributed to the server 136 may be provided by a plurality of devices, such as where the server 136 is a virtualized server executing across a plurality of physical servers.

The server 136 may provide functions such as streaming content to the source device 110 for presentation, authenticating user accounts, providing content lists, and so forth. In some implementations, the server 136 may provide information about the sink devices 104 which may be used when providing the reference signal 128. For example, the server 136 may provide information indicating the presentation capabilities such as resolution, color depth, frame rate, audio frequency response, and so forth of the sink device 104. This information may be used to configure the reference signal 128 to generate a particular emitted signal 130 within the presentation capabilities of the sink device 104. For example, where the sink device 104 uses a monochrome electrophoretic display capable of ten updates per second, a monochrome reference signal at 10 frames per second or less may be used.

Figure 2:
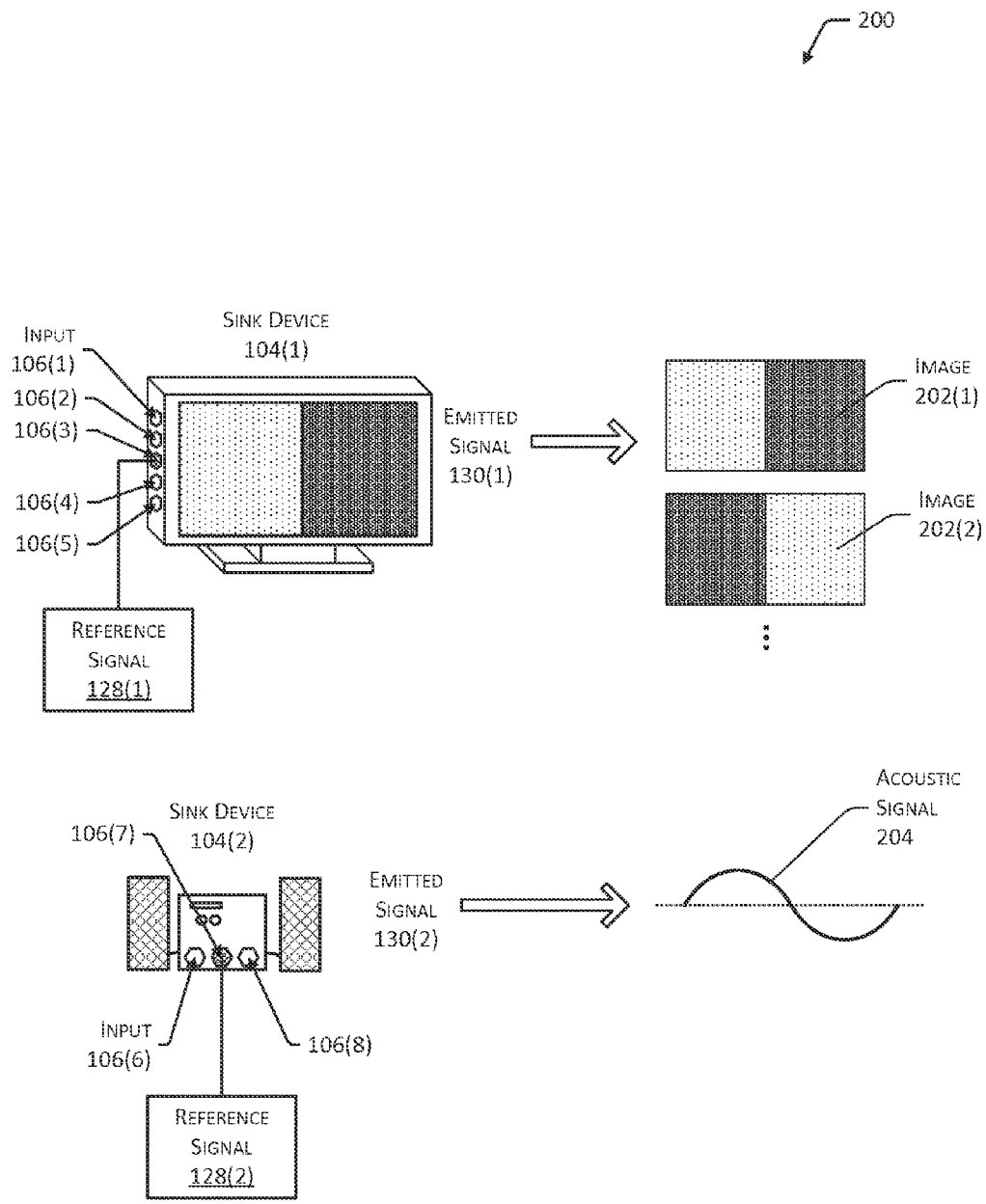
FIG. 2 illustrates emitted signals which may be received by a sensor to associate an input of a sink device with the source device.

FIG. 2 illustrates a schematic diagram 200 of the emitted signals 130, which may be received by a sensor or other input device 126 to associate the input 106 of the sink device 104 with the source device 110. As described above, the sink device 104 may have more than one input 106. In this illustration, the sink device 104(1) has five inputs 106(1)-106(5) while the sink device 104(2) has three inputs 106(6)-(8). The sink device 104 may have inputs 106 of different types. For example, on the sink device 104(1), the input 106(1) may be an HDMI interface, while the input 106(5) is an analog video interface. In comparison, the sink device 104(2) which is an AVR may use HDMI for inputs 106(6)-(7) while the input 106(8) is a TOSLINK® optical connection.

The sink device 104 may be configured to present the reference signal 128, which is received at the input 106. Different inputs 106 may be selected. For example, the remote control 120 may send an infrared signal which, when received by the sink device 104, selects a particular input 106. Once an input 106 has been selected, the data which is provided to the input 106 may be presented.

In this illustration, the sink device 104(1) comprises a display device, which provides a visual emitted signal 130(1) comprising one or more images 202(1), 202(2), ..., 202(V). These images 202 may be detected at least in part by the input devices 126, such as the camera 126(1). The received data 132 may include at least a portion of the images 202, and is provided to the source device 110 for processing by the input identification module 114 to determine a correspondence with the reference signal 128(1).

The reference signal 128 is configured to be presented at least in part by the sink device 104. Data about presentation capabilities, such as that retrieved from the server 136, may be used to select or generate a particular reference signal 128. The reference signal 128 is configured to generate a particular emitted signal 130 upon presentation by the sink device 104. The reference signal 128 may be configured to generate an emitted signal 130 which includes one or more of audio, video, or haptic output. The reference signal 128 and the corresponding images 202 which comprise the emitted signal 130 may depict a solid color, a particular pattern, a known reference image, a sample of content, or the content itself. For example, the reference signal 128(1) may be configured to render alternating frames of all blue and all green with a particular duration for each. In another example, the reference signal 128 may be configured to render a two-dimensional barcode.

The reference signal 128(1) and the images 202 may be rendered such that they are imperceptible or minimally perceptible to a user 102. For example, the sink device 104 display may be presenting images 202 with a refresh rate of 60 frames per second. The reference signal 128(1) may be injected into a stream of content being presented, such that the reference signal 128(1) is presented during every $30^{th}$ frame. The user 102 may be unable to see the resulting emitted signal 130(1) due to the duration, which is below a perceptual threshold. In some implementations, the reference signal 128(1) may be embedded, encoded, or interspersed into content that is being provided to the sink device 104 for presentation.

Also illustrated is the sink device 104(2) comprising an AVR configured to receive a reference signal 128(2) and provide an audio emitted signal 130(2). The reference signal 128(2) may be configured to generate an emitted signal 130(2) which is a single tone, sequence of tones, pre-determined waveform, audio clip, and so forth. For example, in one implementation, the reference signal 128(2) may be configured to generate a pure tone of 261 Hertz when rendered by the sink device 104(2) to form an acoustic signal 204.

The reference signal 128(2) and the corresponding emitted signal 130(2) may be audible or inaudible to the user 102. For example, the reference signal 128(2) may be configured to produce an ultrasonic or infrasonic acoustic signal 204. Similar to above, the reference signal 128(2) may be embedded, encoded, or interspersed with content which is sent to the sink device 104(2). The emitted signal 130(2) may be modulated in amplitude, frequency, phase, and so forth.

The emitted signals 130 are configured to be detected by the one or more input devices 126. For example, the emitted signal 130(2) is configured to be within the detection range of the microphone 126(2).

Figure 3:
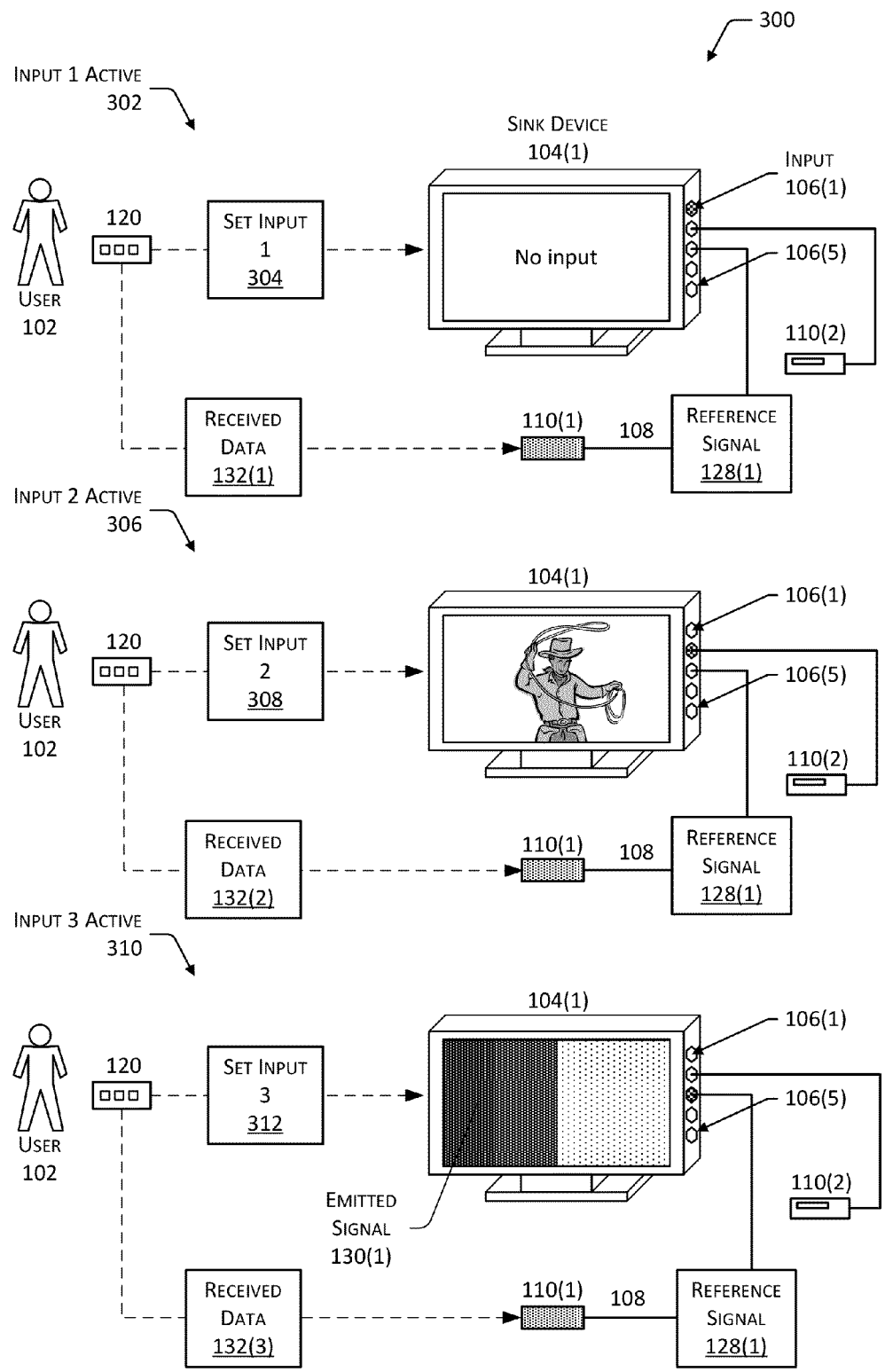
FIG. 3 illustrates a schematic of changing inputs using an infrared command and determining an input of the sink device associated with the source device by detecting an emitted signal comprising an image.

FIG. 3 illustrates a schematic 300 of changing inputs 106 by sending infrared signals. These infrared signals may encode one or more commands. An input 106 of the sink device 104 associated with the source device 110 may be determined by detecting at least a portion of the reference signal 128 in the received data 132. In this illustration, the source device 110 does not have information indicating which of the inputs 106 on the sink device 104(1) it is coupled to. As a result, the input identification module 114 may be used to associate a particular input 106 on the sink device 104 with the source device 110.

At 302, the sink device 104(1) is depicted as a display or other image presentation device. The source device 110(1) is sending the reference signal 128(1) to the sink device 104(1) using the device interface 108. Selection of an input 106 is initiated by sending a "set input 1" command 304 to the sink device 104(1) using the remote control 120. This command 304 may be transmitted as one or more of an optical signal, a radio frequency signal, or an acoustic signal. For example, the remote control 120 may use an infrared transmitter to send the "set input 1" command 304. Based at least in part on the received command 304, the sink device 104(1) sets the input 106(1) to active. As shown in this illustration, because no source device 110 is connected to the input 106(1), a "no input" message is presented by the sink device 104(1).

In this illustration and those following, the "set input" commands are depicted as specifying a particular input 106. In some implementations, the set input may be non-specific to a particular input 106. For example, the "set input" command may be configured to step through all inputs 106 sequentially.

The remote control 120 provides a received data 132(1) to the source device 110(1). For example, the camera 126(1) input device may provide an image of a portion of the room in which the remote control 120 is in. Because the received data 132(1) does not correspond with the reference signal 128(1), the input identification module 114 of the source device 110 (1) may initiate selection of another input 106.

At 306, a "set input 2" command 308 is sent by the remote control 120 to the sink device 104(1). Based at least in part on the received command 308, the sink device 104(1) sets the input 106(2) to active. As shown in this illustration, the source device 110(2) is providing video for a movie, which is presented by the sink device 104(1) now that the input 106(2) associated with the source device 110(2) is selected.

As described above, the remote control 120 provides a received data 132(2) to the source device 110(1). Continuing the example, the camera 126(1) may provide an image of the sink device 104(1) and the picture of a cowboy therein. As described above, because the received data 132(2) does not correspond with the reference signal 128(1), the input identification module 114 of the source device 110(1) may initiate selection of another input 106.

At 310, a "set input 3" command 312 is sent by the remote control 120 to the sink device 104(1). Based at least in part on the received command 312, the sink device 104(1) sets the input 106(3) to active. As shown in this illustration, the source device 110(1) which is providing the reference signal 128(1) is coupled to the input 106(3). With the input 106(3) now designated as the active input, the emitted signal 130(1) rendered from the reference signal 128(1) is presented by the sink device 104(1).

As described above, the remote control 120 provides a received data 132(3) to the source device 110(1). Continuing the example, the camera 126(1) may provide an image of the display of the sink device 104(1) and the picture of the emitted signal 130(1) which is based on the reference signal 128(1). At least a portion of the received data 132(3) corresponds with the reference signal 128(1). Based on this correspondence, the input identification module 114 of the source device 110(1) may generate input association data 116 which relates the sink device 104(1) and the input 106(3).

In this disclosure, the received data 132 is depicted as being generated by the remote control 120. In other implementations, other devices may provide the received data 132. For example, the source device 110(1) may have one or more input devices 126. Also, while the remote control 120 is depicted as sending the commands 304, 308, and 312, in some implementations, the commands may be transmitted by the source device 110(1). For example, the source device 110(1) may have an infrared transmitter or a radio frequency transmitter configurable to communicate with the sink device 104(1).

While the selection of the inputs 106 is depicted as incremental in this disclosure, in other implementations, other sequences of the input 106 selection may be used. For example, the inputs 106 may be selected in reverse order 106(5), (4), (3), (2), (1), randomly, or in another sequence.

Figure 4:
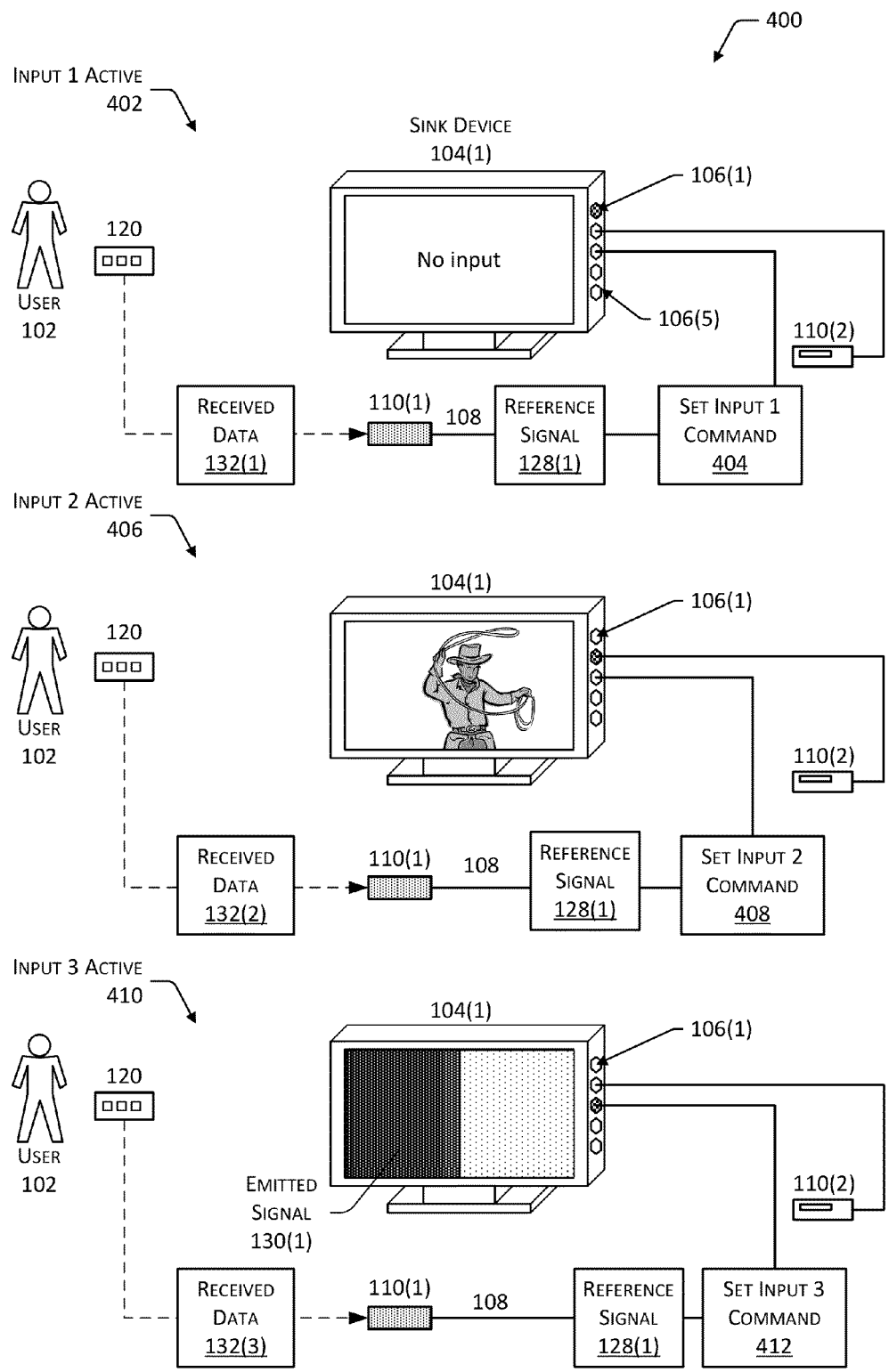
FIG. 4 illustrates a schematic of changing inputs using a device interface command and determining an input of the sink device associated with the source device by detecting an emitted signal comprising an image.

FIG. 4 illustrates a schematic 400 of changing inputs 106 using a command sent using the device interface 108 and determining an input 106 of the sink device 104 associated with the source device 110 by detecting an emitted signal 130 comprising an image 202. As described above, in this illustration, the source device 110(1) does not have information indicating which of the inputs 106 on the sink device 104(1) it is coupled to. As a result, the input identification module 114 may be used to associate a particular input 106(1)-(5) on the sink device 104(1) with the source device 110(1).

At 402, the sink device 104(1) is depicted as a display or other image presentation device. The source device 110(1) is sending the reference signal 128(1) to the sink device 104(1) using the device interface 108. Selection of an input 106 is initiated by sending a "set input 1" command 404 to the sink device 104(1) using the device interface 108. This command 404 may be transmitted as one or more of an optical or electrical signal. For example, the source device 110(1) may send a "set input 1" command 404 compliant with the Consumer Electronics Control ("CEC") standard along the HDMI. Based at least in part on the received command 404, the sink device 104(1) sets the input 106(1) to active. As shown in this illustration, because no source device 110 is connected to the input 106(1), a "no input" message is presented by the sink device 104(1).

As described above in FIG. 3, the remote control 120 provides the received data 132(1) to the source device 110(1). Because the received data 132(1) does not correspond with the reference signal 128(1), the input identification module 114 of the source device 110(1) may initiate selection of another input 106.

At 406, a "set input 2" command 408 is sent by the remote control 120 to the sink device 104(1). Based at least in part on the received command 408, the sink device 104(1) sets the input 106(2) to active. As described above, the source device 110(2) is providing video for a movie, which is presented by the sink device 104(1) now that the input 106(2) associated with the source device 110(2) is selected.

As described above, the remote control 120 provides the received data 132(2) to the source device 110(1). Because the received data 132(2) does not correspond with the reference signal 128(1), the input identification module 114 of the source device 110(1) may initiate selection of another input 106.

At 410, a "set input 3" command 412 is sent by the remote control 120 to the sink device 104(1). Based at least in part on the received command 412, the sink device 104(1) sets the input 106(3) to active. As shown in this illustration, the source device 110(1) which is providing the reference signal 128(1) is coupled to the input 106(3). With the input 106(3) now designated as the active input, the emitted signal 130(1) rendered from the reference signal 128(1) is presented by the sink device 104(1).

As described above, the remote control 120 provides the received data 132(3) to the source device 110(1). Based on this correspondence between the received data 132(3) and the reference signal 128(1), the input identification module 114 of the source device 110(1) may generate input association data 116 which relates the sink device 104(1) and the input 106(3).

Figure 5:
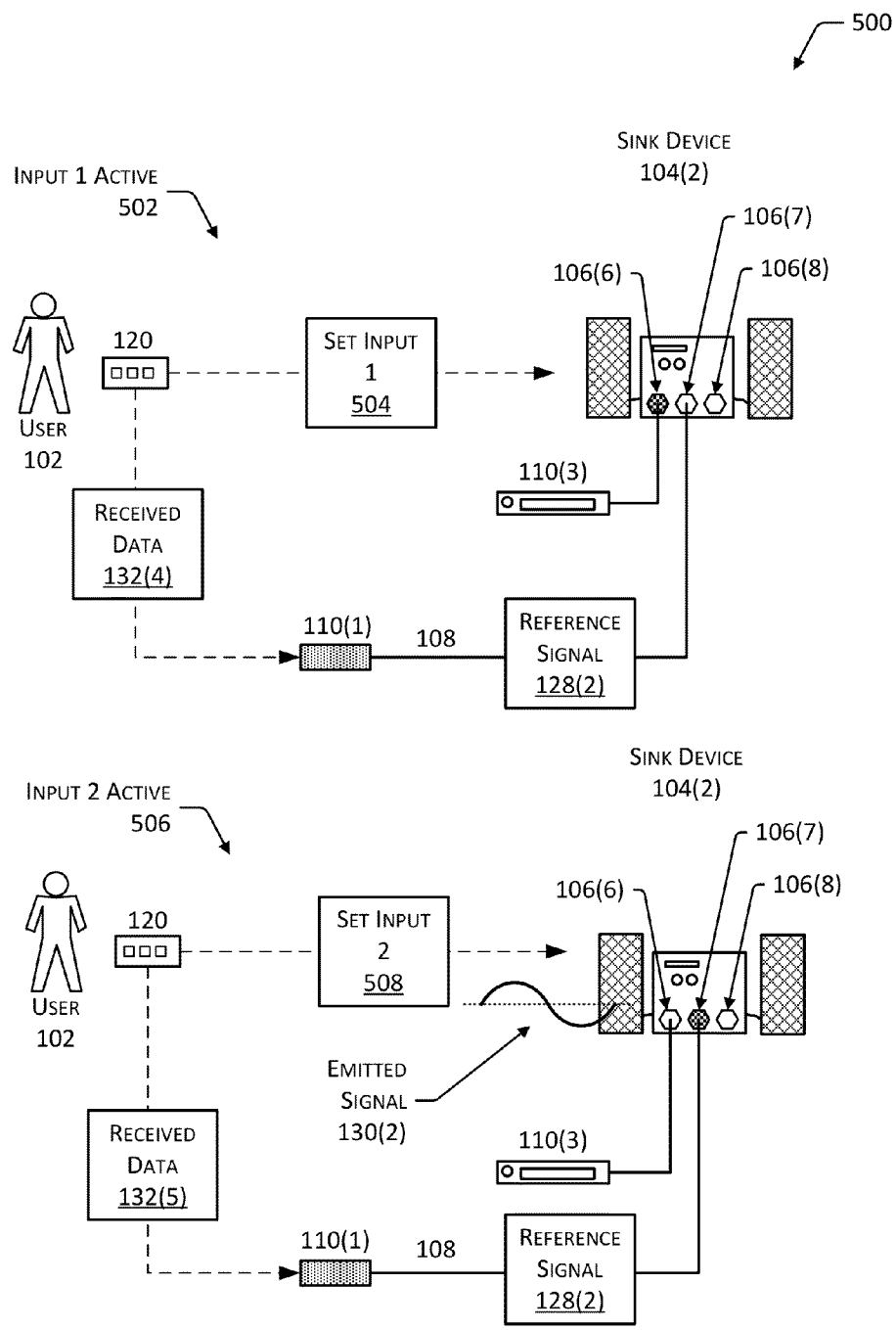
FIG. 5 illustrates a schematic of changing inputs using an infrared command and determining an input of the sink device associated with the source device by detecting an acoustic emitted signal.

FIG. 5 illustrates a schematic diagram 500 of changing inputs 106 using an infrared command and determining an input 106 of the sink device 104 associated with the source device 110 by detecting the acoustic 204 emitted signal 130

(2). In this illustration, the source device 110(1) does not have information indicating which of the inputs 106 on the sink device 104(2) it is coupled to. As a result, the input identification module 114 may be used to associate a particular input 106(6)-(8) on the sink device 104(2) with the source device 110(1).

At 502, the sink device 104(2) is depicted as an AVR or audio presentation device. The source device 110(1) is sending the reference signal 128(2) to the sink device 104(2) using the device interface 108. Selection of an input 106 is initiated by sending a "set input 1" command 504 to the sink device 104(1) using the remote control 120. This command 504 may be transmitted as one or more of an optical signal, a radio frequency signal, or an acoustic signal 204. For example, the remote control 120 may use an infrared transmitter to send the "set input 1" command 504. Based at least in part on the received command 504, the sink device 104(2) sets the input 106(6) to active. As shown in this illustration, the source device 110(3) is providing audio to the input 106(6).

As described above, the remote control 120 provides a received data 132(4) to the source device 110(1). Continuing the example, the microphone 126(2) may provide audio information which may include a portion of the audio content provided by the source device 110(3). As described above, because the received data 132(4) does not correspond with the reference signal 128(2), the input identification module 114 of the source device 110(1) may initiate selection of another input 106.

At 506, a "set input 2" command 508 is sent by the remote control 120 to the sink device 104(2). Based at least in part on the received command 508, the sink device 104(2) sets the input 106(7) to active. As shown in this illustration, the source device 110(1) which is providing the reference signal 128(2) is coupled to the input 106(7). With the input 106(7) now designated as the active input, the emitted signal 130(2) rendered from the reference signal 128(2) is presented by the sink device 104(2).

As described above, the remote control 120 provides a received data 132(5) to the source device 110(1). Continuing the example, the microphone 126(2) may provide audio data that includes the emitted signal 130(2), which is based on the reference signal 128(2). At least a portion of the received data 132(5) corresponds with the reference signal 128(2). Based on this correspondence, the input identification module 114 of the source device 110(1) may generate input association data 116 which relates the sink device 104(2) and the input 106(7).

Figure 6:
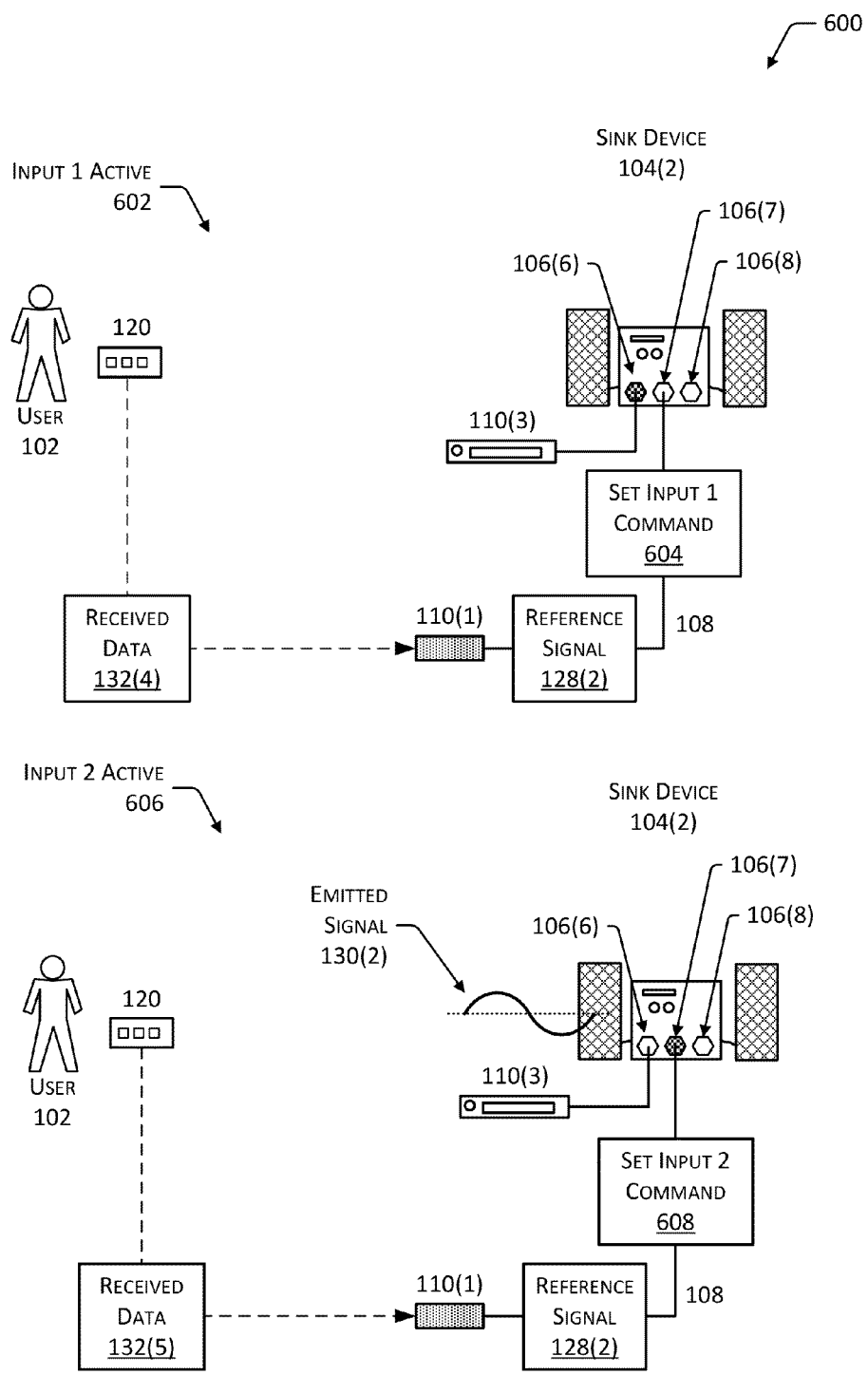
FIG. 6 illustrates a schematic of changing inputs using a device interface command and determining an input of the sink device associated with the source device by detecting an acoustic emitted signal.

FIG. 6 illustrates a schematic 600 of changing inputs 106 using a device interface 108 command and determining an input 106 of the sink device 104 associated with the source device 110 by detecting an acoustic 204 emitted signal 130. As described above, in this illustration, the source device 110(1) does not have information indicating which of the inputs 106(6)-(8) on the sink device 104(2) it is coupled to. As a result, the input identification module 114 may be used to associate a particular input 106(6)-(8) on the sink device 104(2) with the source device 110(1).

At 602, the sink device 104(2) is depicted as an AVR or audio presentation device. The source device 110(1) is sending the reference signal 128(2) to the sink device 104(2) using the device interface 108. Selection of an input 106 is initiated by sending a "set input 1" command 604 to the sink device 104(2) using the device interface 108. Based at least in part on the received command 604, the sink device 104(2) sets the input 106(6) to active. As shown in this illustration, the source device 110(3) is providing audio to the input 106(6).

As described above, the remote control 120 provides a received data 132(4) to the source device 110(1). As above, because the received data 132(4) does not correspond with the reference signal 128(2), the input identification module 114 of the source device 110(1) may initiate selection of another input 106.

At 606, a "set input 2" command 608 is sent to the sink device 104(2) using the device interface 108. Based at least in part on the received command 608, the sink device 104(2) sets the input 106(7) to active. As shown in this illustration, the source device 110(1) which is providing the reference signal 128(2) is coupled to the input 106(7). With the input 106(7) now designated as the active input, the emitted signal 130(2) rendered from the reference signal 128(2) is presented by the sink device 104(2).

As described above, the remote control 120 provides a received data 132(5) to the source device 110(1). At least a portion of the received data 132(5) corresponds with the reference signal 128(2). Based on this correspondence, the input identification module 114 of the source device 110(1) may generate input association data 116 which relates the sink device 104(2) and the input 106(7).

The operations of FIGS. 3-6 may be combined to test permutations of device configuration. The sink devices 104 may be daisy-chained or have other configurations in which the output of one sink device 104 is determined at least in part by an input selection of an intermediate device. For example, the source device 110(1) may couple to the television sink device 104(1) which may in turn be coupled to the AVR sink device 104(2). In some configurations, in order for the reference signal 128(2) to be emitted by the sink device 104(2), the sink device 104(1) may need to be configured on the input 106 corresponding to the source device 110(1).

The input identification module 114 may be configured to adjust the inputs 106 of the sink devices 104 to test the various input permutations which may result from a daisy-chain or other configuration. Continuing the example of the sink device 104(2) coupled to the sink device 104(1), the input identification module 114 may be configured to set the sink device 104(2) to use input 106(6) and step through the inputs 106(1)-(5). Should the emitted signal 130 not be detected, the sink device 104(2) may be set to use the next input 106(7), and the inputs 106(1)-(5) may again be stepped through. This process may be continued until the combination that results in the emitted signal 130 is attained.

Figure 7:
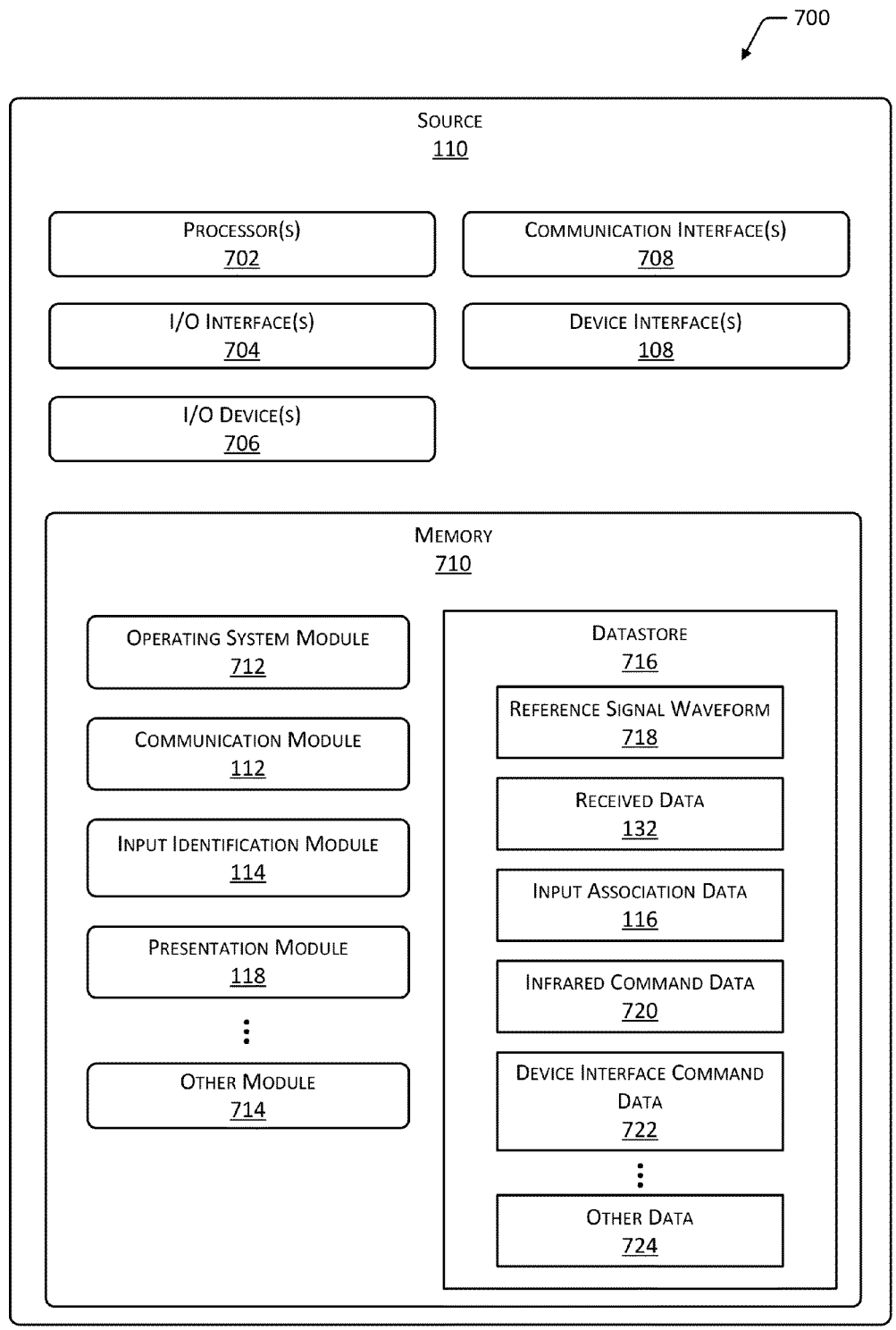
FIG. 7 illustrates a block diagram of a source device configured to support input switching identification.

FIG. 7 illustrates a block diagram 700 of a source device 110 configured to support input switching identification. The source device 110 may include one or more processors 702 configured to execute one or more stored instructions. The processors 702 may comprise one or more cores. The source device 110 may include one or more input/output ("I/O") interface(s) 704 to allow the source device 110 to communicate with other devices. The I/O interfaces 704 may comprise inter-integrated circuit ("I2C"), serial peripheral interface bus ("SPI"), USB, RS-232, media device interface such as HDMI, and so forth The I/O interface(s) 704 may couple to one or more I/O devices 706. The I/O devices 706 may include input devices 126 such as one or more of a camera, a microphone, a touch sensor, a button, and so forth. The I/O devices 706 may also include output devices such as one or more of a display, a printer, audio speakers, haptic output device, and so forth. In some embodiments, the I/O devices 706 may be physically incorporated with the source device 110 or may be externally placed.

The source device 110 may also include one or more communication interfaces 708. The communication interfaces 708 are configured to provide communications between the source device 110 and other devices. The communication interfaces 708 may include personal area networks, wireless local area networks, wireless wide area networks, and so forth. The source device 110 may communicate with the remote control 120 using one or more of the communication interfaces 708. For example, the source device 110 may communicate with the remote control 120 using a Bluetooth® personal area network.

As described above, one or more of the device interfaces 108 are also present in the source device 110. The device interfaces 108 allow for the exchange of information between the source device 110 and the sink device 104. The device interface 108 may include one or more of a HDMI, TOSLINK®, Ethernet, analog video, analog audio, IEEE 1394, USB, Bluetooth®, ZigBee®, and so forth. The device interfaces 108 may allow for wired or wireless communication between the source device 110 and one or more sink devices 104 or other media devices.

The source device 110 may also include one or more busses or other internal communications hardware or software that allow for the transfer of data between the various modules and components of the source device 110.

As shown in FIG. 7, the source device 110 includes one or more memories 710. The memory 710 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 710 provides storage of computer readable instructions, data structures, program modules, and other data for the operation of the source device 110.

The memory 710 may include at least one operating system ("OS") module 712. The OS module 712 is configured to manage hardware resource devices such as the I/O interfaces 704, the I/O devices 706, the communication interfaces 708, the device interfaces 108, and provide various services to applications or modules executing on the processors 702. Also stored in the memory 710 may be the communication module 112, the input identification module 114, and the presentation module 118.

The communication module 112, as described above, is configured to establish and support communications between the source device 110 and one or more sink devices 104, other source devices 110, and other devices. The communication module 112 may utilize the communication interfaces 708, the device interfaces 108, or both to communicate with external devices. For example, the communication module 112 may establish communications with the remote control 120 using one of the communication interfaces 708 and with the sink device 104 using the device interface 108.

The input identification module 114 is configured to determine a particular input 106 on the sink device 104 which results in the presentation of content. For example, as described above with regard to FIGS. 3-6, a known reference signal 128 may be provided to the sink device 104 while various inputs 106 of the sink device 104 are selected. The input devices 126 of the remote control 120 may be used to detect the emitted signal 130, which is based on the reference signal 128. Based on this determination, a determination may be made which associates the selected input 106 to the sink device 104 for presentation. Based on the determination, the input identification module 114 generates the input association data 116. This is discussed in more detail below with regard to FIG. 9.

The presentation module 118 is configured to present content or other information such as a user interface on the sink device 104. The presentation module 118 may be configured to receive streamed content from an external source such as a server 136, or which has been previously stored on the source device 110.

Other modules 714 may be stored in the memory 710. For example, a digital rights management module may work in conjunction with the presentation module 118 to facilitate access to content.

The memory 710 may also include a datastore 716 to store information. The datastore 716 may use a flat file, database, linked list, tree, or other data structure to store the information. In some implementations, the datastore 716 or a portion of the datastore 716 may be distributed across one or more other devices including servers 136, network attached storage devices, and so forth.

The datastore 716 may store a reference signal waveform 718, or other information suitable for generating the reference signal 128. The received data 132 and the input association data 116 may also be stored in the datastore 716. As described above, the source device 110 may be configured to access the input association data 116 and configure the sink device 104 to a previously identified input 106 on the sink device 104 to enable presentation.

Infrared command data 720 may be stored within the datastore 716. The infrared command data 720 comprises information suitable for use in generated particular infrared commands which, when received and processed by the sink device 104 or another device, cause one or more actions on the sink device 104 or the other device. For example, the infrared command data 720 may store a particular infrared waveform which is associated with the commands "set input 1" 304, "set input 2" 308, and so forth. The infrared command data 720, or a portion thereof, may be provided to the remote control 120 for transmission to the sink device 104.

Similarly, the datastore 716 may store device interface command data 722. The device interface command data 722 comprises information suitable for use in generating particular commands for transmission on the device interface 108 which, when received and processed by the sink device 104 or another device coupled to the device interface 108, causes one or more actions on the sink device 104 or the other device. For example, the device interface command data 722 may store a particular instruction sequence which is associated with the commands "set input 1" 604, "set input 2" 608, and so forth. The source device 110 may access the device interface command data 722 and send the commands using the device interface 108 to initiate selection of a particular input 106, or take other actions.

The datastore 716 may contain other data 724, such as previously stored content, user preferences, and so forth.

Figure 8:
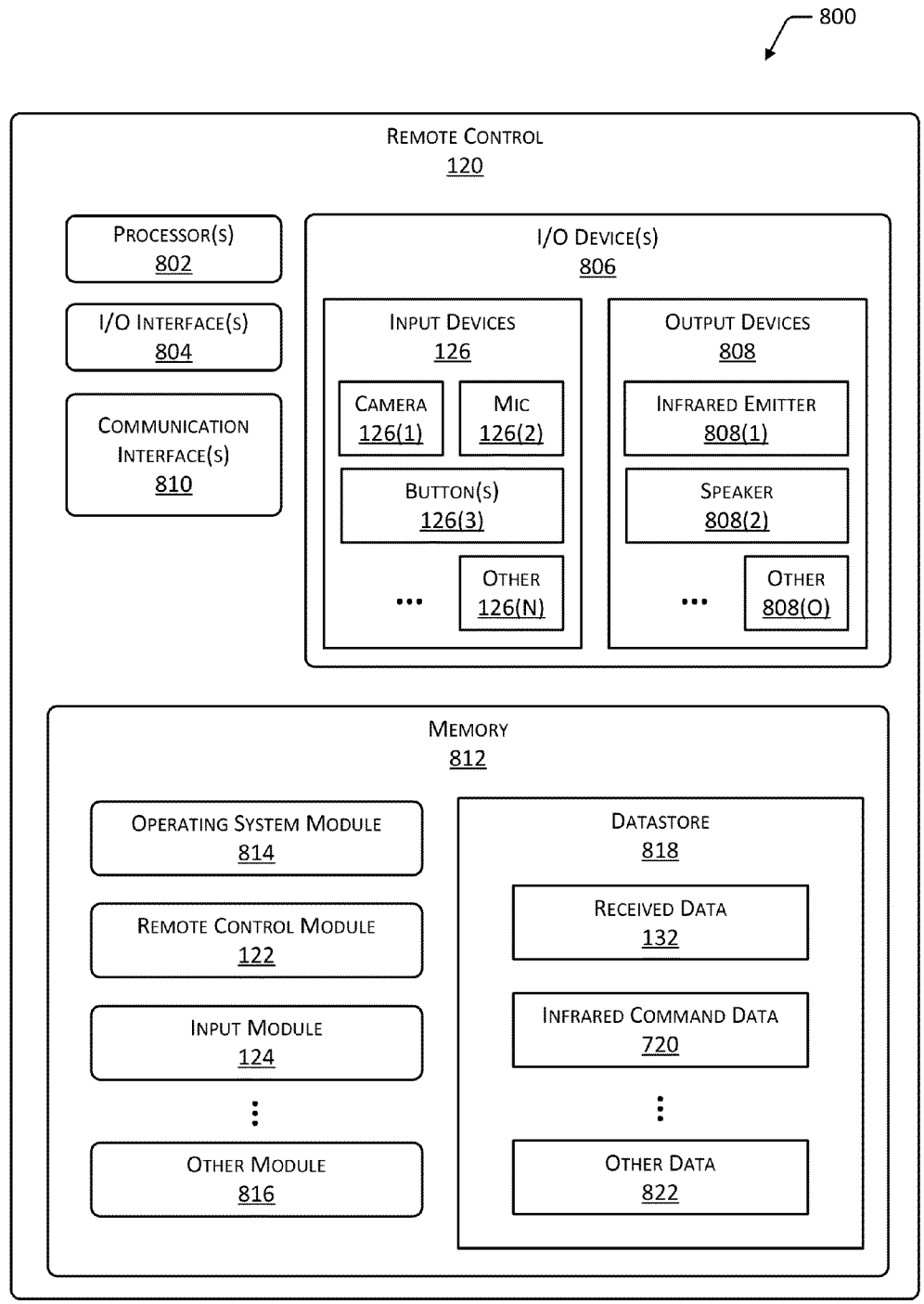
FIG. 8 illustrates a block diagram of a remote control configured to support input switching identification.

FIG. 8 illustrates a block diagram 800 of the remote control 120 configured to support input switching identification. The remote control 120 may include one or more processors 802 configured to execute one or more stored instructions. The processors 802 may comprise one or more cores. The remote control 120 may also include one or more I/O interface(s) 804 to allow the remote control 120 to communicate with other devices. The I/O interfaces 804 may comprise I2C, SPI, USB, RS-232, and so forth.

The I/O interface(s) 804 may couple to one or more I/O devices 806. The I/O device(s) 806 may include the input devices 126 such as one or more of the camera 126(1), the microphone 126(2), buttons 126(3), a touch sensor, and so forth. In some implementations other devices 126(N) may be used to acquire light signals, such as a charge coupled device strip detector, photosensor, and so forth. For example, a photosensor may be used to detect a sequence of the images 202(1), 202(2), . . . , 202(K) which are based on the reference signal 128 and configured to generate an emitted signal 130(1) that is a sequence of single color screens.

The I/O devices 806 may also include output devices 808 such as one or more of an infrared emitter 808(1), a speaker 808(2), and other devices 808(O) such as a display, a haptic output device, and so forth. In some embodiments, the I/O devices 806 may be physically incorporated with the remote control 120 or may be externally placed.

The remote control 120 may also include one or more communication interfaces 810. The communication interfaces 810 are configured to provide communications between the remote control 120 and other devices such as the source device 110 and the sink device 104. The communication interfaces 810 may include optical transmitters, optical receivers, personal area networks, wireless local area networks, wireless wide area networks, and so forth. The remote control 120 may communicate with the sink device 104 using one or more of the communication interfaces 810. For example, the remote control 120 may use an optical communication interface 810 to send infrared commands to the sink device 104.

The remote control 120 may also include one or more busses or other internal communications hardware or software that allow for the transfer of data between the various modules and components of the remote control 120.

As shown in FIG. 8, the remote control 120 includes one or more memories 812. The memory 812 comprises one or more CRSM. The memory 812 provides storage of computer readable instructions, data structures, program modules, and other data for the operation of the remote control 120.

The memory 812 may include at least one OS module 814. The OS module 814 is configured to manage hardware resource devices such as the I/O interfaces 804, the I/O devices 806 and 808, the communication interfaces 810, and provide various services to applications or modules executing on the processors 802. Also stored in the memory 812 may be the remote control module 122 and the input module 124.

The remote control module 122 is configured to communicate with the source device 110 such that data may be exchanged between the two devices. For example, the remote control module 122 may accept input from the input devices 126 and provide this information to the source device 110 using the communication interfaces 810. The remote control module 122 may also be configured to generate control signals which are configured to initiate one or more operations on one or more of the sink device 104, the source device 110, and so forth. For example, the remote control module 122 may receive instructions from the source device 110 to transmit the infrared command 304 to "set input 1" on the sink device 104(1).

Other modules 816 may be stored in the memory 812. For example, a user interface module may be configured to present a user interface on a display output device 808.

The memory 812 may also include a datastore 818 to store information. The datastore 818 may use a flat file, database, linked list, tree, or other data structure to store the information. In some implementations, the datastore 818 or a portion of the datastore 818 may be distributed across one or more other devices, such as the source device 110.

The datastore 818 may store the received data 132. For example, the input module 124 may activate the camera 126(1) and store data which is representative of the images acquired by the camera 126(1). In another example, the input module 124 may activate the microphone 126(2) and store data which is representative of the sounds detected by the microphone 126(2). The received data 132 may be provided to the source device 110 using the device interface 108.

The datastore 818 may include infrared command data 720, such as described above. The infrared command data 720 may be used by the remote control module 122 to generate infrared commands for transmission using the communication interface 810.

The datastore 818 may also contain other data 822, such as user preferences, radio frequency command data, communication protocol information, and so forth.

In some implementations, the functionality of the remote control 120 may be provided by a device such as a tablet computer, smartphone, or other device which is capable of independent operation. For example, the user 102 may connect their tablet computer to the source device 110 using a Wi-Fi® wireless local area network connection, personal area network, and so forth. This independent operation may allow for the performance of functions other than remotely controlling a sink device 104 or a source device 110. For example, the tablet computer may be used for word processing, messaging, and so forth.

Illustrative Processes

Figure 9:
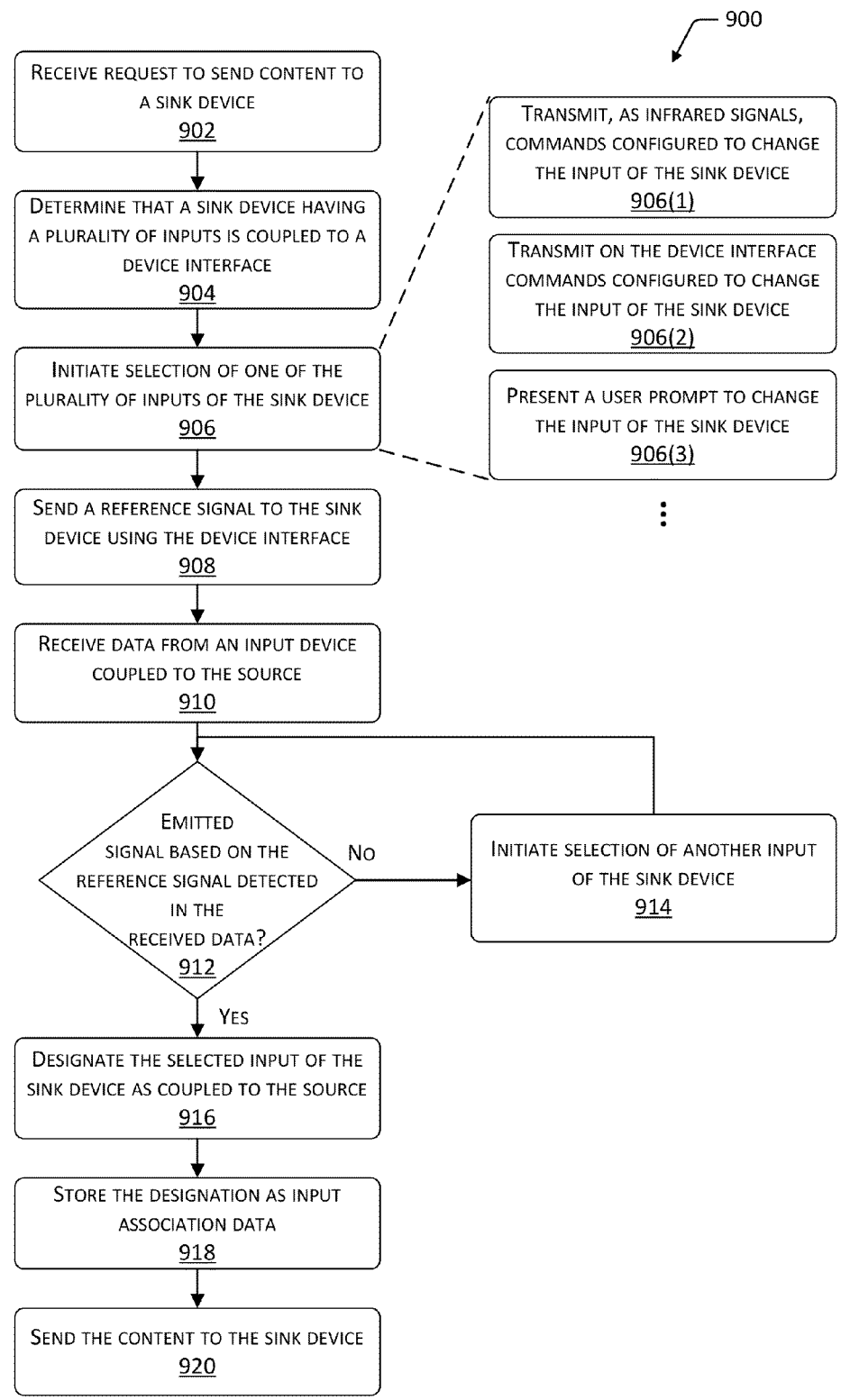
FIG. 9 is a flow diagram of a process of input switching identification and generating input association data.

FIG. 9 is a flow diagram 900 of a process of input switching identification and generating input association data 116. This process may be implemented at least in part by the input identification module 114 which may execute on the source device 110.

Block 902 receives a request to send content to the sink device 104. For example, the user 102 may wish to view a movie on the display sink device 104(1). The sink device 104 may also be described as a media output device, because in some implementations, the sink device 104 may include televisions, AVRs, projectors, and so forth, which are configured to present information to the user 102.

Block 904 determines that the sink device 104 having a plurality of inputs 106 is coupled to the device interface 108. For example, the source device 110 may receive a hot plug indication on the device interface 108, which implements HDMI, from the sink device 104. In some implementations, this determination may include identification of the sink device 104.

Block 906 initiates selection of one of the plurality of inputs 106 of the sink device 104. The initiating selection may include issuing one or more commands configured to, upon receipt and processing by the sink device 104, change the active input 106 of the sink device 104. The initiated selection may be specific to an input 106, such as "set input 1" or may be non-specific, such as "set to next input." Three methods of initiating selection are illustrated here, but it is understood that other methods may be used. The methods described in blocks 906(1)-(3) may be used alone or in combination with one another.

Block 906(1) may initiate selection of one of the plurality of inputs 106 of the sink device 104 by transmitting one or more commands. These commands may be transmitted as infrared signals. The one or more commands are configured to, upon receipt and processing by the sink device 104, change the input 106 of the sink device 104 from one input 106 to another. For example, a particular input selection command may be retrieved from the infrared command data 720.

Block 906(2) may initiate selection of one of the plurality of inputs 106 of the sink device 104 by transmitting one or more commands on the device interface 108. The one or more commands are configured to, upon receipt and processing by the sink device 104, change the input 106 of the sink device 104 from one input 106 to another. For example, the CEC command for "set input 1" may be retrieved from the device interface command data 722 and sent along the HDMI device interface 108 to the sink device 104.

Block 906(3) causes the presentation of a user prompt to the user 102 to change the input 106 of the sink device 104 from one input 106 to another. For example, where the display sink device 104(1) is being configured, and audio prompt instructing the user 102 to change the input 106 may be delivered by the audio sink device 104(2), or by the speaker 808(2) in the remote control 120. In some implementations where the make, model, or other identifying information about the sink device 104 is known, instructions specific to that make or model may be provided.

Block 908 sends a reference signal 128 to the sink device 104 using the device interface 108. The reference signal 128 is configured to cause the sink device 104 to generate the emitted signal 130 when processed by the sink device 104. As described above, the reference signal 128 may comprise video data, audio data, or both. For example, the reference signal 128(1) configured to generate the images 202 comprising video of a sequence of different colors may be sent over the HDMI device interface 108. The reference signal 128 may comprise one or more of audio, video, or still images. For example, the reference signal 128 may comprise the sequence of different colors and a particular audio tone.

In another implementation, the action of block 908 may be based at least in part on the receipt of the request. For example, receipt of a request to send content may trigger the sending of the reference signal 128.

In one implementation, an additional block may receive a user input from the remote control 120, and the action of block 908 may be based at least in part on the user input. For example, the user 102 may press a button 126(3) on the remote control 120 to initiate configuration of the source device 110.

In still another implementation, the action of block 908 may be based at least in part on a block determining a change in the state of the sink device 104 on the device interface 108. For example, the hot plug detect may indicate coupling of the sink device 104(1) to the source device 110(1) using the HDMI type of device interface 108.

Block 910 receives data from one or more of the input devices 126. For example, the received data 132 may include image data from the camera 126(1), audio data from the microphone 126(2), or both. The received data 132 may be indicative of the emitted signal 130. The reference signal 128, corresponding emitted signal 130, and the input devices 126 are configured to be complementary, such that the input devices 126 are capable of detecting the reference signal 128 and corresponding emitted signal 130 under operating conditions.

In some implementations, the input device 126 may comprise a portable computer communicatively coupled to the source device 110. The portable computer may include a display and a touch sensor, and one or more of a camera or a microphone.

Block 912 analyzes the received data 132 to determine presence of at least a portion of an emitted signal 130 from the sink device 104 based on the reference signal 128. For example, the images 202 may be processed to determine presence of particular colors in a particular sequence. In another example, the acoustic signal 204 may be processed to look for a particular audio tone.

When block 912 determines no emitted signal 130 is present in the received data 132, the process proceeds to block 914. Block 914 initiates selection of a different input 106 of the sink device 104. For example, an infrared command may be transmitted, a command may be sent on the device interface 108, or the user 102 may be prompted to change the input 106 of the sink device 104(1). The process may then proceed to a point at or before block 912. For example, the process may proceed to the block 912 for the analysis of the received data 132.

When block 912 determines at least a portion of the emitted signal 130 is present in the received data 132, the process proceeds to block 916. Block 916 designates the selected input 106 of the sink device 104 as coupled to the device interface 108 of the source device 110. For example, if the block 906 set the sink device 104(1) to use the input 106(3), the input 106(3) is designated as being the input 106 which is connected to the sink device 104(1).

Block 918 stores the designation as the input association data 116. For example, the input association data 116 may now include an entry with a sink device ID of 104(1) and a sink device input of 3, or 106(3).

Block 920 sends the content to the sink device 104. Now that the process has set the sink device 104 to the input 106 which is receiving the data from the source device 110, presentation may proceed.

Figure 10:
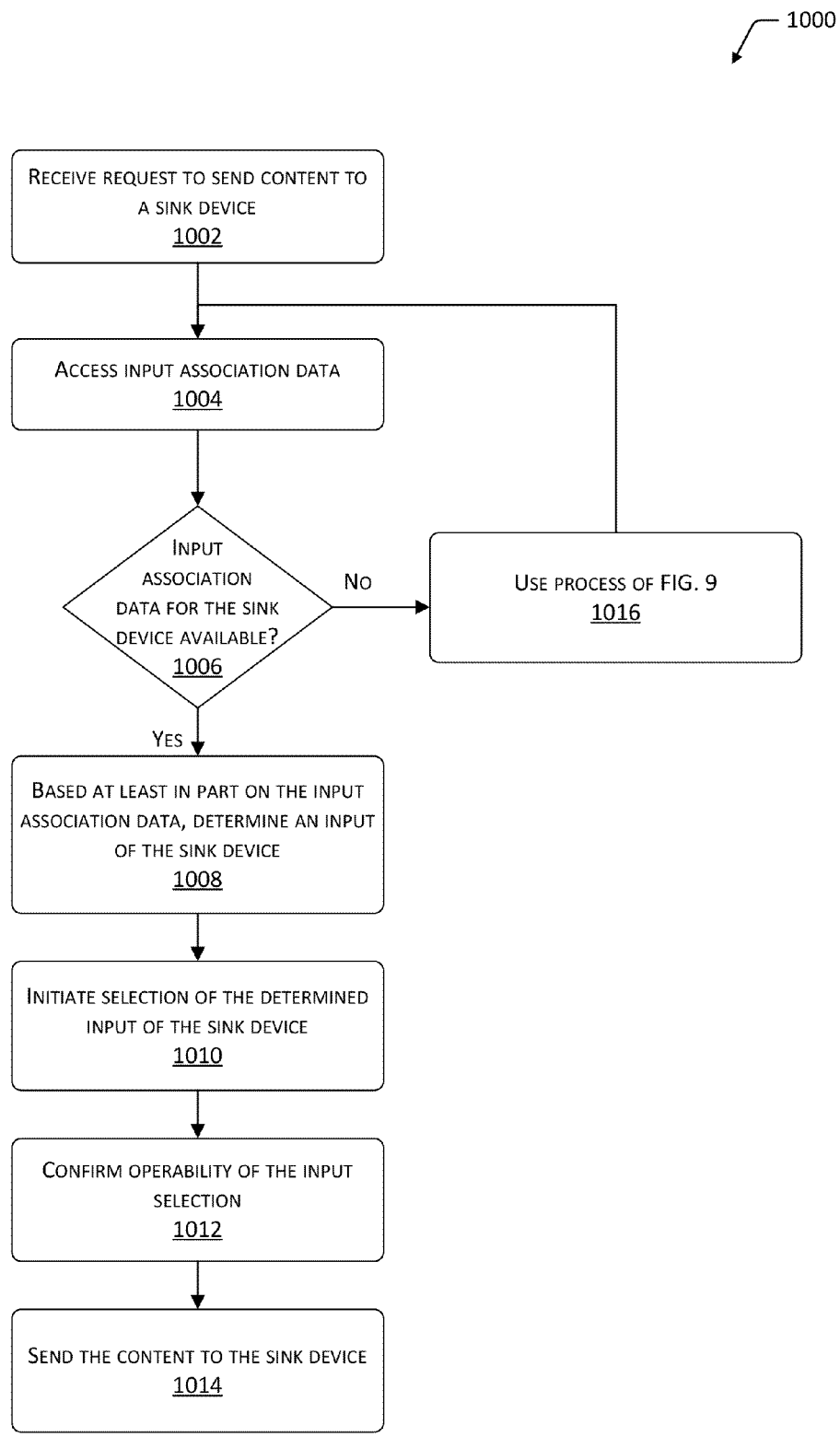
FIG. 10 is a flow diagram of a process of using the input association data to select an input of a sink device.

FIG. 10 is a flow diagram 1000 of a process of using the input association data 116 to select an input 106 of a sink device 104. This process may be implemented at least in part by the presentation module 118 which may execute on the source device 110.

Block 1002 receives a request to send content to the sink device 104 using a device interface 108. For example, the user 102 may use the remote control 120 to select a piece of music to play on the AVR sink device 104(2).

In an alternative implementation, block 1002 may receive data indicating a user interface or portion thereof is to be presented to the user 102. For example, the source device 110 may have been rebooted and now is configured to present a graphical menu to the user 102 using a display sink device 104.

Block 1004 accesses input association data 116. As described above, the input association data 116 may comprise one or more relationships between a particular sink device 104 and a particular input 106 of that sink device 104.

Block 1006 determines whether input association data 116 is available for the sink device 104. For example, the input association data 116 may be searched to find that information is available for the sink ID for sink device 104(2).

Block 1008, based at least in part on the available input association data 116, determines the input 106 of the sink device 104. Continuing the example, the sink device 104 input 106 associated with the entry for the sink ID of 104(2) in the input association data 116 is the input 106(7).

Block 1010 initiates selection of the determined input 106 of the sink device 104. For example, the operations described in blocks 906(1)-(3) may be used to set the sink device 104(2) to have the input 106(7) active.

Block 1012 confirms operability of the input selection. Operability may be confirmed by sending the reference signal 128 and determining the presence of at least a portion of the emitted signal 130 from the sink device 104 which is based on the reference signal 128. For example, an image 202, tone, or both, may be presented and detected. As described above, in some implementations, a portion of the content to be presented by the sink device 104 may be used as the reference signal 128.

Block 1014 sends the content to the sink device 104 using the device interface 108. Continuing the example, the sink device 104(2) is now configured and ready to present the content from the source device 110(1).

Returning to block 1006, when the input association data 116 is unavailable for the sink device 104, as shown by block 1016, the process may proceed to the process 900 described above with regard to FIG. 9. Once the input 106 of the sink device 104 has been identified, it may be added to the input association data 116 and used to configure the sink device 104 for presentation.

In another implementation, operability of a current input 106 may be confirmed after receiving the request of the block 1002. Should operability fail, such as when the input 106 is not correctly set or the configuration has changed, the process may proceed to block 1004.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer-readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system, comprising:
   a device interface configured to couple to a media output device;
   a microphone;
   at least one memory storing computer-executable instructions; and
   at least one processor configured to: couple to the device interface and the microphone, access the at least one memory, and execute the computer-executable instructions to:
      determine that a media output device having a plurality of inputs is coupled to the device interface;
      initiate selection of one of the plurality of inputs of the media output device by causing presentation of a user prompt to change the input of the media output device;
      send a reference signal to the media output device using the device interface, wherein the reference signal is configured to cause the media output device to generate an emitted signal comprising one or more sounds;
      receive audio data from the microphone which is indicative of sounds detected by the microphone;
      analyze the received audio data to detect at least a portion of the emitted signal from the media output device, wherein the emitted signal is based on the reference signal;
      when no emitted signal is determined as present in the received audio data:
         initiate selection of another input of the media output device; and
         analyze the received audio data to detect at least a portion of the emitted signal from the media output device which is based on the reference signal;
      when the emitted signal is determined as present in the received audio data:
         designate the selected input of the media output device as coupled to the device interface; and
         store the designation as input association data.

2. The system of claim 1, further comprising a remote control, wherein the microphone is disposed in a remote control.

3. The system of claim 1, wherein the media output device comprises a television with one or more speakers.

4. The system of claim 1, wherein the reference signal comprises audio content.

5. A computer-implemented method for utilizing a computerized system, the computer-implemented method comprising:
   causing presentation of a user prompt to select an input of a sink device;
   sending a reference signal to the sink device using a device interface, wherein the reference signal is configured to cause the sink device to generate an emitted signal;
   receiving data which is indicative of input received by an input device;
   analyzing the received data to determine presence of at least a portion of the emitted signal; and
   when at least a portion of the emitted signal is determined as present in the received data:
      designating a selected input of the sink device as coupled to the device interface.

6. The method of claim 5, wherein the sink device comprises one or more displays, audio output devices, or haptic output devices which are configured to generate output.

7. The method of claim 5, further comprising storing the designation of the selected input as input association data.

8. The method of claim 5, wherein the reference signal comprises video data and the input device comprises a camera.

9. The method of claim 5, wherein the reference signal comprises audio data and the input device comprises a microphone.

10. The method of claim 5, wherein the input device comprises a portable computer communicatively coupled to the computerized system, the portable computer comprising a display and a touch sensor, and one or more of a camera or a microphone.

11. The method of claim 5, further comprising:
   receiving a request to send content to the sink device; and
   wherein the sending the reference signal to the sink device using the device interface is based at least in part on the request.

12. The method of claim 5, further comprising:
   receiving a user input from a remote control; and
   wherein the sending the reference signal to the sink device using the device interface is based at least in part on the user input.

13. The method of claim 5, further comprising:
   determining a change in connection state of the sink device on the device interface; and
   wherein the sending the reference signal to the sink device using the device interface is based at least in part on the determined change in the connection state.

14. The method of claim 5, further comprising:
when no emitted signal is determined as present in the received data:
initiating selection of different input of the sink device.

15. The method of claim 14, the initiating selection of the input of the sink device comprising causing transmission of one or more commands configured to change the input of the sink device.

16. The method of claim 14, the initiating selection of the input of the sink device comprising causing transmission on the device interface of one or more commands configured to change the input of the sink device from one input to another.

17. A computer-implemented method for utilizing processing resource devices of a computerized system, the computer-implemented method comprising:
receiving a request to send content to a sink device using a device interface;
accessing input association data comprising one or more relationships between a particular sink device and a particular input of that sink device;
determining availability of input association data for the sink device;
based at least in part on available input association data:
determining an input of the sink device;
initiating selection of the determined input of the sink device by causing presentation of a user prompt to change the input of the sink device; and
sending the content to the sink device using the device interface.

18. The method of claim 17, further comprising:
based at least in part on unavailability of the input association data for the sink device:
sending a reference signal to a sink device using the device interface, wherein the reference signal is configured to cause the sink device to generate an emitted signal;
receiving data from an input device which is indicative of input received by the input device;
analyzing the received data to determine presence of at least a portion of the emitted signal which is based on the reference signal;
when at least a portion of the emitted signal is determined as present in the received data:
designating the selected input of the sink device as coupled to the device interface;
storing the association of the selected input and the sink device in the input association data; and
proceeding to the determining input association data is available for the sink device.

19. The method of claim 17, further comprising:
when no emitted signal is determined as present in the received data:
initiating selection of a different input of the sink device; and
proceeding to the analyzing of the received data.

20. The method of claim 17, the initiating selection of the input of the sink device comprising causing transmission of one or more infrared signals configured to change the input of the sink device.

21. The method of claim 17, the initiating selection of the input of the sink device comprising causing transmission on the device interface of one or more commands configured to change the input of the sink device.

22. The method of claim 21, wherein the device interface comprises a high definition multimedia interface ("HDMI") and the one or more commands are compliant with the Consumer Electronics Control ("CEC") standard.

* * * * *